United States Patent
Kim et al.

(10) Patent No.: US 10,649,139 B2
(45) Date of Patent: May 12, 2020

(54) OPTICAL WAVEGUIDE STRUCTURE

(71) Applicant: ELECTRONICS AND TELECOMMUNICATIONS RESEARCH INSTITUTE, Daejeon (KR)

(72) Inventors: Duk Jun Kim, Daejeon (KR); Young-Ho Ko, Daejeon (KR); Dong-Young Kim, Daejeon (KR); Jong-Hoi Kim, Daejeon (KR); Yongsoon Baek, Daejeon (KR); Jung-Ho Song, Daejeon (KR); Dong Hyo Lee, Daejeon (KR); Byung-Seok Choi, Sejong (KR); Won Seok Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/215,416

(22) Filed: Dec. 10, 2018

(65) Prior Publication Data
US 2019/0219760 A1 Jul. 18, 2019

(30) Foreign Application Priority Data

Jan. 15, 2018 (KR) .................. 10-2018-0005269

(51) Int. Cl.
*G02B 6/10* (2006.01)
*G02B 6/122* (2006.01)
*G02B 6/12* (2006.01)
*G02B 6/30* (2006.01)

(52) U.S. Cl.
CPC .......... *G02B 6/122* (2013.01); *G02B 6/1228* (2013.01); *G02B 6/305* (2013.01); *G02B 2006/12152* (2013.01)

(58) Field of Classification Search
CPC ...... B82Y 20/00; G02B 6/10; G02B 6/12007; G02B 6/122; G02B 6/1225
See application file for complete search history.

(56) References Cited

U.S. PATENT DOCUMENTS

| | | |
|---|---|---|
| 5,577,141 A | 11/1996 | Adar et al. |
| 5,745,618 A | 4/1998 | Li |
| 6,892,044 B2 | 5/2005 | Yu |
| 7,317,853 B2 | 1/2008 | Laurent-Lund et al. |

(Continued)

OTHER PUBLICATIONS

US 5,755,662 A1, 06/2014, Kim (withdrawn)
(Continued)

*Primary Examiner* — Jennifer Doan (57) ABSTRACT

An optical waveguide structure includes a substrate and a core structure disposed on the substrate. The substrate includes a first waveguide region, a second waveguide region, and a transition region between the first waveguide region and the second waveguide region. The core structure includes first core segments arranged in a first direction and a second direction crossing the first direction on the transition region. The core structure includes second core segments arranged in the first direction and the second direction on the second waveguide region. The first direction and the second direction are parallel to a top surface of the substrate.

14 Claims, 11 Drawing Sheets (56) References Cited

U.S. PATENT DOCUMENTS

| | | |
|---|---|---|
| 9,671,560 B1 | 6/2017 | Fondeur et al. |
| 2013/0156362 A1 | 6/2013 | Kim et al. |
| 2016/0124151 A1* | 5/2016 | ten Have ................. G02B 3/08 385/24 |
| 2017/0192176 A1* | 7/2017 | Kopp ..................... G02B 6/305 |

OTHER PUBLICATIONS

Z. Weissman et al., "2-D Mode Tapering via Tapered Channel Waveguide Segmentation", Elecytonics Letters, Jul. 30, 1992, p. 1514-1516, vol. 28, No. 16.

\* cited by examiner

OPTICAL WAVEGUIDE STRUCTURE

CROSS-REFERENCE TO RELATED APPLICATIONS

This U.S. non-provisional patent application claims priority under 35 U.S.C. § 119 of Korean Patent Application No. 10-2018-0005269, filed on Jan. 15, 2018, the entire contents of which are hereby incorporated by reference.

BACKGROUND

The present disclosure herein relates to a planar waveguide, and more particularly, to an optical mode size conversion technique of a planar waveguide.

When an end of a planar optical waveguide is optically connected to an end of an optical fiber or another planar optical waveguide, an optical mode size conversion technique of the optical waveguide is required to minimize an optical power loss.

As an example of the optical mode size conversion technique, there is a method of converting an optical mode size by gradually reducing a width of a core in an optical mode size conversion region. However, in this technique, the optical mode size may significantly increases as the width of the core decreases. In this case, when the optical waveguide is manufactured, it may be difficult to precisely control the width of the core at an end of the optical waveguide so as to approach a design value.

As another example of the optical mode size conversion technique, there is a method of converting the optical mode size by using a segmented core structure one-dimensionally arranged in the optical mode size conversion region. This technique has three design variables (a width and a length of each of segmented cores and a distance between the segmented cores), but it is difficult to derive a satisfactory design in terms of an optical mode size and shape.

SUMMARY

The present disclosure provides a planar waveguide structure in which a degree of freedom of a design for optical mode size conversion increases.

The object of the present disclosure is not limited to the aforesaid, but other objects not described herein will be clearly understood by those skilled in the art from descriptions below.

An embodiment of the inventive concept provides an optical waveguide structure including: a substrate including a first waveguide region, a second waveguide region, and a transition region between the first waveguide region and the second waveguide region; and a core structure disposed on the substrate. The core structure may include: first core segments arranged in a first direction and a second direction crossing the first direction on the transition region; and second core segments arranged in the first direction and the second direction on the second waveguide region. The first direction and the second direction may be parallel to a top surface of the substrate.

In an embodiment, the core structure may further include a main core pattern crossing the first waveguide region and the transition region in the first direction. The main core pattern may be disposed between the first core segments.

In an embodiment, the main core pattern may cross the second waveguide region via the transition region in the first direction. The main core pattern may be disposed between the second core segments.

In an embodiment, the transition region may include: a first transition region adjacent to the first waveguide region; and a second transition region adjacent to the second waveguide region. The main core pattern may include a plurality of third core segments arranged to be spaced apart from each other in the first direction on the transition region. The first core segments may be disposed around a column of the plurality of third core segments on the second transition region.

In an embodiment, each of the plurality of third core segments may have a length in the first direction. The lengths of the plurality of third core segments may gradually decrease in the first direction on the transition region.

In an embodiment, each of the plurality of third core segments may have a width in the second direction. The widths of the plurality of third core segments may gradually decrease in the first direction on the transition region.

In an embodiment, each of the plurality of third core segments may have a width in the second direction. The widths of the plurality of third core segments may gradually increase and then decrease in the first direction on the transition region.

In an embodiment, the main core pattern may include a plurality of fourth core segments arranged to be spaced apart from each other in the first direction on the second waveguide region.

The second core segments and the plurality of fourth core segments may be aligned with each other in the second direction on the second waveguide region.

In an embodiment, the first core segments and the plurality of third core segments may be aligned with each other in the second direction on the second transition region.

In an embodiment, the main core pattern may include a plurality of fourth core segments arranged to be spaced apart from each other in the first direction on the second waveguide region. The second core segments and the plurality of fourth core segments may be arranged in a zigzag form in the second direction on the second waveguide region.

In an embodiment, the first core segments and the plurality of third core segments may be arranged in a zigzag form in the second direction on the second transition region.

In an embodiment, the transition region may include: a first transition region adjacent to the first waveguide region; and a second transition region adjacent to the second waveguide region. The main core pattern may have a line shape that is tapered in the first direction on the transition region. The first core segments may be disposed around the main core pattern on the second transition region.

In an embodiment, the main core pattern may have a line shape extending in the first direction on the second waveguide region. The second core segments may be aligned with each other in the second direction with the main core pattern therebetween on the second waveguide region.

In an embodiment, the first core segments may be aligned with each other in the second direction with the main core pattern therebetween on the second transition region.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the present invention will be described with reference to the accompanying drawings so as to sufficiently understand constitutions and effects of the present invention. The present disclosure may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In the accompanying drawings, the components are shown enlarged for the sake of convenience of explanation, and the proportions of the components may be exaggerated or reduced for clarity of illustration.

Unless terms used in embodiments of the present invention are differently defined, the terms may be construed as meanings that are commonly known to a person skilled in the art. Hereinafter, the present disclosure will be described in detail by explaining preferred embodiments of the invention with reference to the accompanying drawings.

Figure 1:
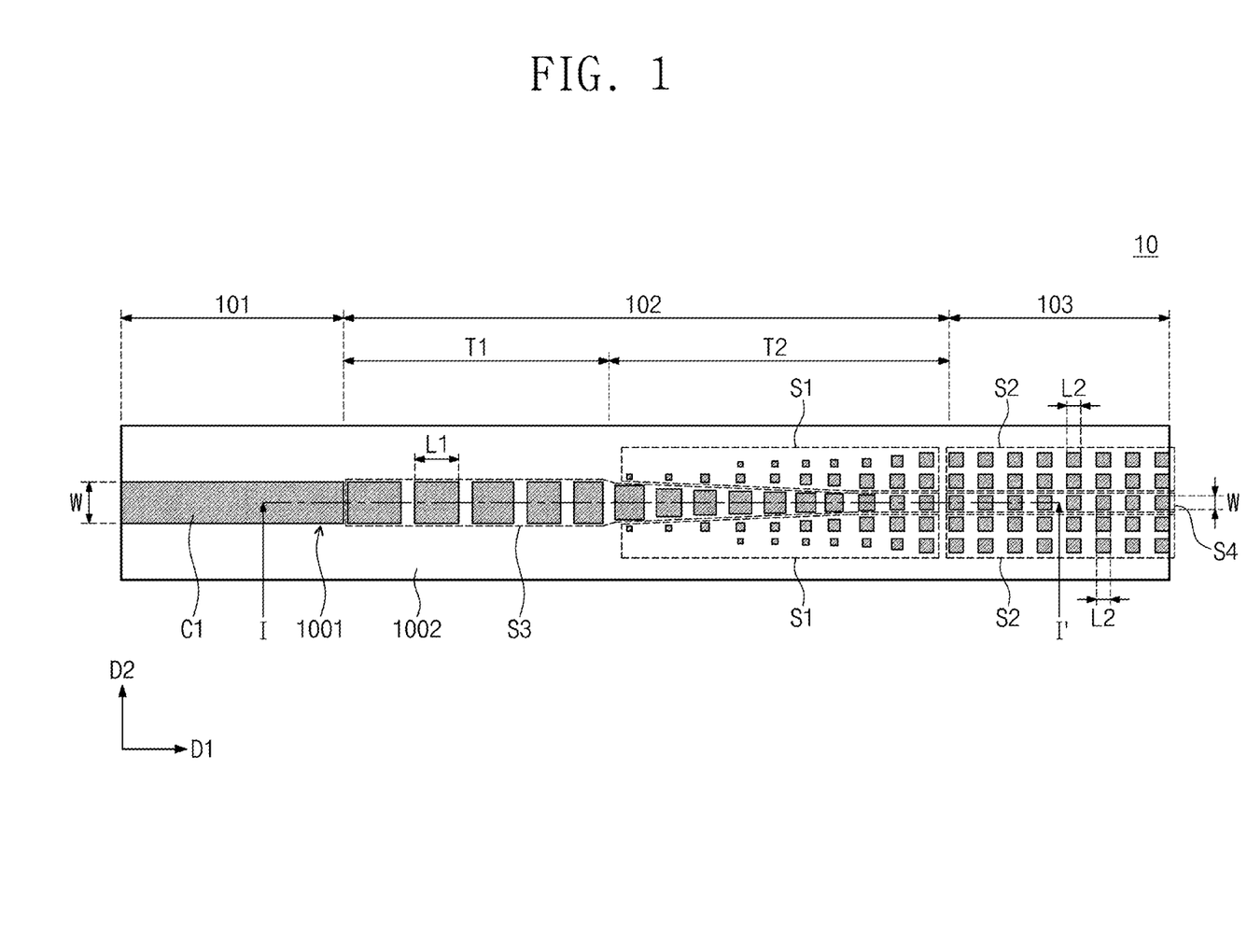
FIG. 1 is a plan view of an optical waveguide structure including a two-dimensionally segmented core structure according to some embodiments of the inventive concept.

FIG. 1 is a plan view of an optical waveguide structure including a two-dimensionally segmented core structure according to some embodiments of the inventive concept. Referring to FIG. 1, an optical waveguide structure 10 may include a substrate 1002 and a core structure 1001 on the substrate 1002. The substrate 1002 may include a first waveguide region 101, a second waveguide region 103, and a transition region 102 between the first waveguide region 101 and the second waveguide region 103. The transition region 102 may include a first transition region T1 adjacent to the first waveguide region 101 and a second transition region T2 adjacent to the second waveguide region 103. The core structure 1001 may include first core segments S1 arranged in a first direction D1 and a second direction D2 crossing the first direction D1 on the second transition region T2. The core structure 1001 may include second core segments S2 arranged in the first direction D1 and the second direction D2 on the second waveguide region 103. The first direction D1 and the second direction D2 may be directions parallel to a top surface of the substrate 1002. The core structure 1001 may include a main core pattern C1 crossing the first waveguide region 101, the transition region 102, and the second waveguide region 103 in the first direction D1. The main core pattern C1 may include a plurality of third core segments S3 arranged to be spaced apart from each other in the first direction D1 on the transition region 102. The main core pattern C1 may include a plurality of fourth core segments S4 arranged to be spaced apart from each other in the first direction D1 on the second waveguide region 103. A portion of the main core pattern C1 on the first waveguide region 101 may have a line shape that extends in the first direction D1.

Each of the plurality of third core segments S3 may have a width W in the second direction D2. The plurality of third core segments S3 may have widths W that gradually decrease in the first direction D1 on the transition region 102. Each of the plurality of third core segments S3 may have a length L1 in the first direction D1. The plurality of third core segments S3 may have lengths L1 that gradually decrease in the first direction D1 on the transition region 102. That is, in view of a plane, the plurality of third core segments S3 may have sizes that gradually decrease in the first direction D1 on the transition region 102. In view of the plane, the sizes of the first core segments S2 may increase or be uniform in the first direction D1 on the second transition region T2. Each of the second core segments S2 and the plurality of fourth core segments S4 may have a width W in the second direction D2. On the second waveguide region 103, the second core segments S2 and the plurality of fourth core segments S4 may have a uniform width W in the first direction D1. Each of the second core segments S2 and the plurality of fourth core segments S4 may have a length L2 in the first direction D1. On the second waveguide region 103, the second core segments S2 and the plurality of fourth core segments S4 may have a uniform length L2 in the first direction D1. That is, in view of the plane, the second core segments S2 and the plurality of fourth core segments S4 may have a uniform size in the first direction D1.

The first core segments S1 may be disposed around a column of the plurality of third core segments S3 on the second transition region T2. Each of the plurality of third core segments S3 on the second transition region T2 may be aligned with the first core segments S1 adjacent thereto in the second direction D2. The second core segments S2 may be disposed around a column of the plurality of fourth core segments S4 on the second waveguide region 103. Each of the plurality of fourth core segments S4 on the second waveguide region 103 may be aligned with the second core segments S2 adjacent thereto in the second direction D2.

Although a case in which each of the first and second core segments S1 and S2 and the third and fourth core segments S3 and S4 has a rectangular shape in view of the plane is illustrated as an example in FIG. 1, the concept of the present disclosure is not limited thereto. Unlike FIG. 1, the planar shape of each of the first and second core segments S1 and S2 and the third and fourth core segments S3 and S4 may be designed or manufactured in various shapes such as circular, oval, triangular, and diamond shapes.

Figure 2:
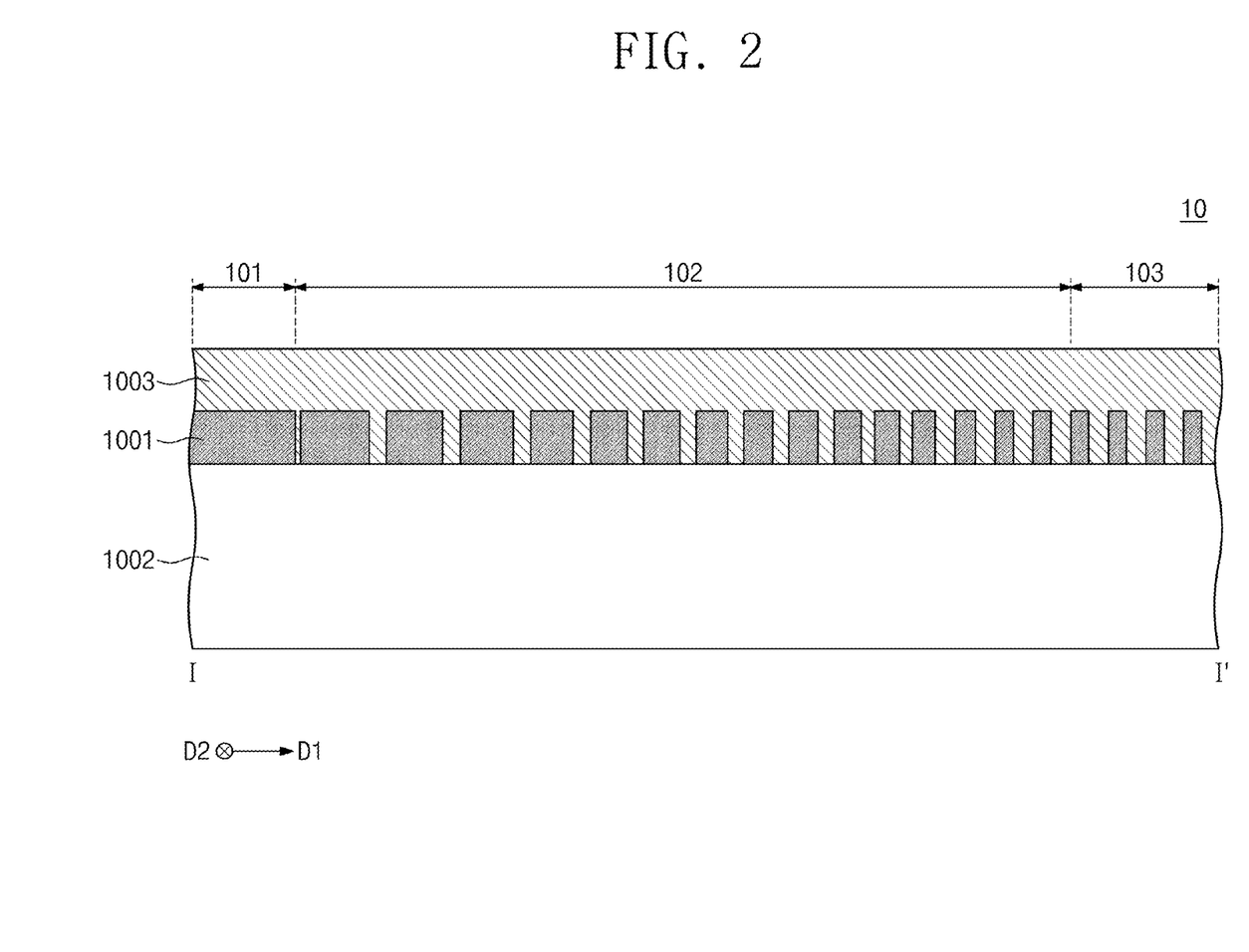
FIG. 2 is a cross-sectional view of the optical waveguide structure including a main core pattern of FIG. 1.

FIG. 2 is a cross-sectional view of the optical waveguide structure 10 including the main core pattern C1 of FIG. 1. Referring to FIG. 2, a clad 1003 may be provided on the substrate 1002 to cover the core structure 1001. The substrate 1002 may include at least one of a semiconductor substrate, a glass substrate, a plastic substrate, or a metal substrate. The core structure 1001 may be disposed on the substrate 1002. The clad 1003 may be provided on the core structure 1001.

The core structure 1001 may have a refractive index greater than that of the clad 1003. For example, the core structure 1001 may be a silicon nitride layer or a silicon oxynitride layer, and the clad 1003 may be a silicon oxide layer. For another example, the core structure 1001 may be a silicon oxide layer doped with germanium (Ge), and the clad 1003 may be a silicon oxide layer doped with boron (B) and/or phosphorus (P).

Since the clad 1003 has a refractive index less than that of the core structure 1001, light incident from one end of the core structure 1001 may be restricted in the core structure 1001 to travel in the first direction D1. The light may be emitted to the other end of the core structure 1001 through the core structure 1001.

The core structure 1001 may be manufactured by depositing a core layer on the substrate 1002 and then patterning the core layer. The patterning the core layer may include formation of a mask pattern defining a planar shape of the core structure 1001 and etching of the core layer by using the mask pattern as an etch mask. The clad 1003 may be manufactured by depositing a clad layer covering the core structure 1001 on the substrate 1002. In this case, a cross-sectional structure of the core, which is perpendicular to the traveling direction of the light (i.e., waveguide light) may have an approximately rectangular shape.

Figure 3:
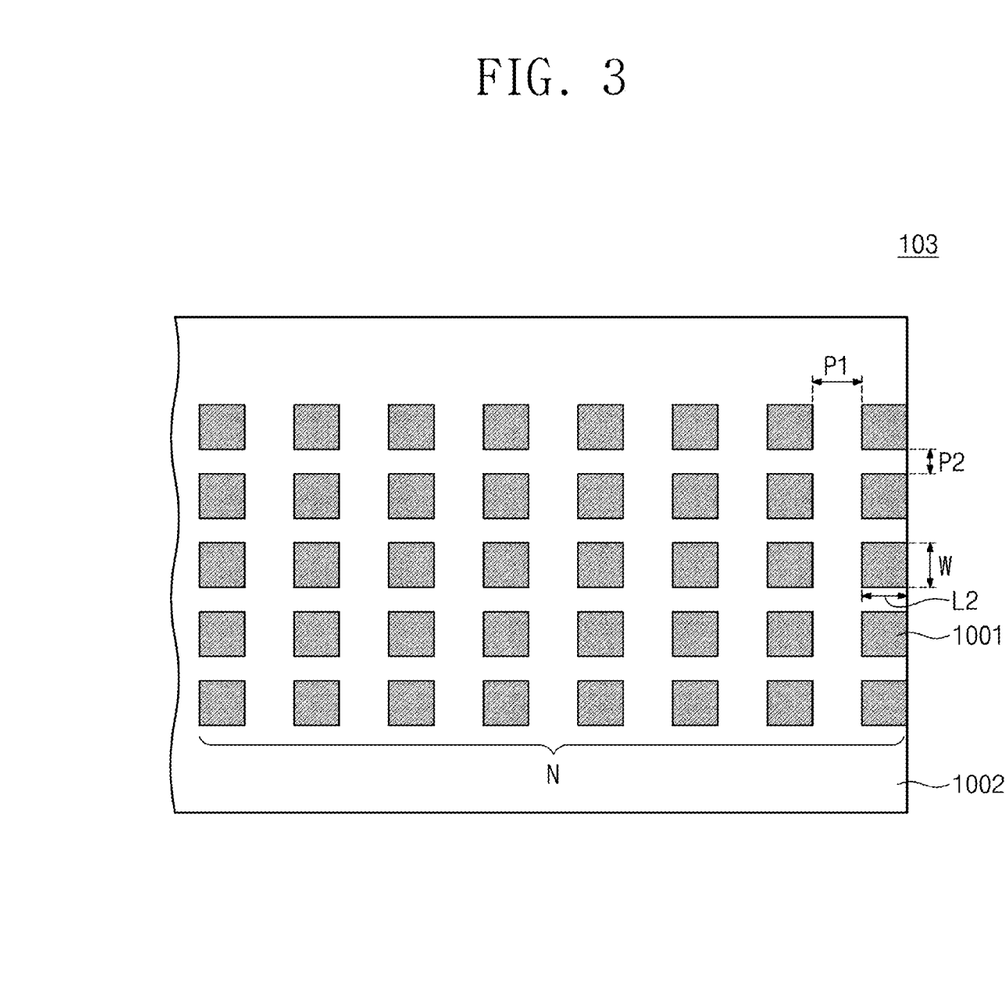
FIG. 3 is an enlarged view of a second waveguide region of FIG. 1.

FIG. 3 is an enlarged view of the second waveguide region 103 of FIG. 1. The second core segments S2 and the plurality of fourth core segments S4 may be periodically arranged in the first direction D1 and the second direction D2. In this case, the width W and length L2 of each of the second core segments S2 and the fourth core segments S4, a first spaced distance P1 between the second core segments S2 and the fourth core segments S4 in the first direction D1, a second spaced distance P2 between the second core segments S2 and the fourth core segments S4 in the second direction D2, and the number N of second core segments S2 and plurality of fourth core segments S4, which are disposed on the second waveguide region 103, may act as design variables for converting an optical mode size. That is, the optical waveguide structure 10 according to the concept of the inventive concept may have an increasing design variable, and thus, a degree of freedom of the design for converting the optical mode size may increase.

Figure 4:
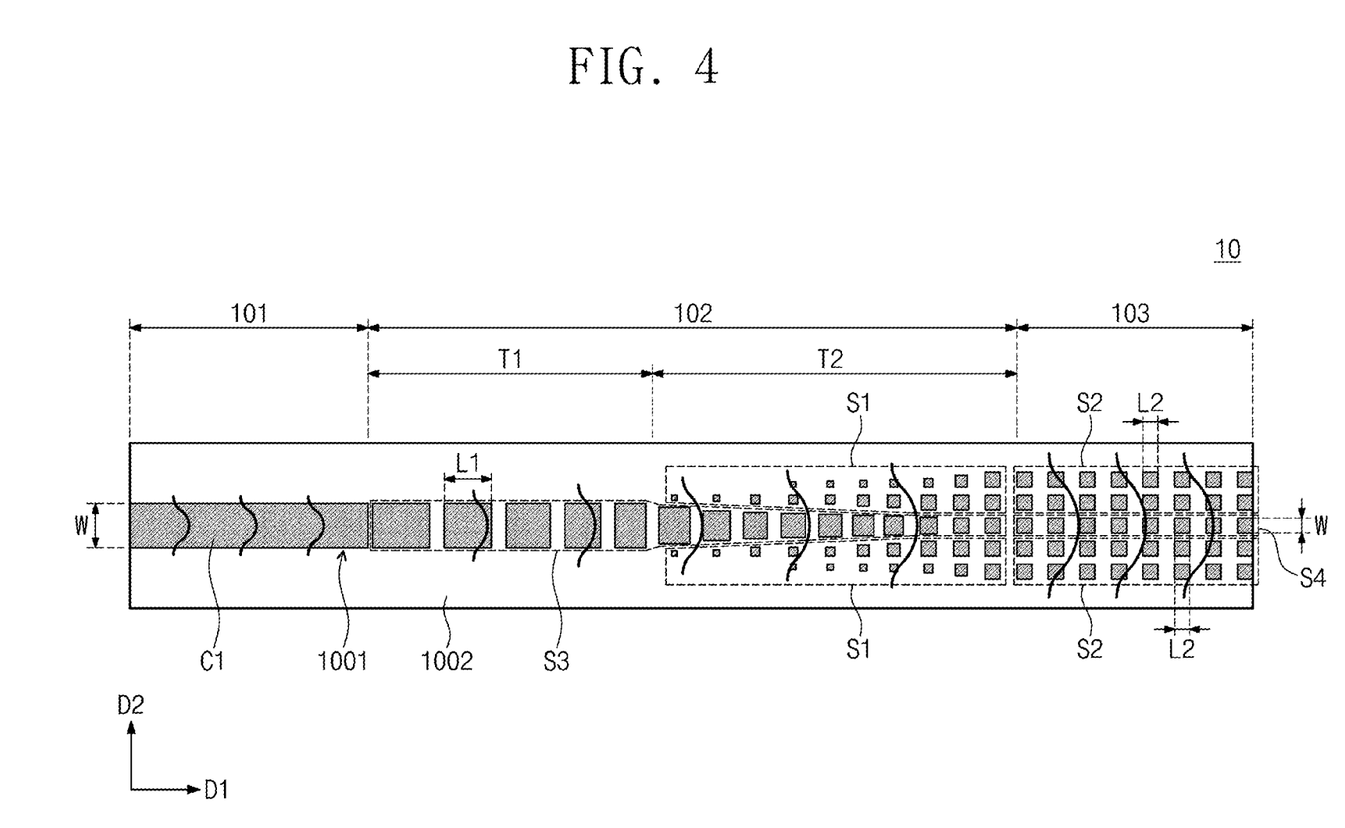
FIG. 4 is a conceptual view illustrating a variation in optical mode size of FIG. 1.

FIG. 4 is a conceptual view illustrating a variation in optical mode size of FIG. 1. Referring to FIG. 4, the optical waveguide structure 10 may basically be a single mode planar optical waveguide in which only a zeroth-order or fundamental optical mode is excited. A parabolic curve represents the optical mode, and as the parabola increases in size, the optical mode may increase in size. In this case, a difference in refractive index between the core structure 1001 and the clad 1003 may be constantly maintained. The optical mode may have a uniform size on the first waveguide region 101. The optical mode may have a size that gradually increases on the transition region 102. Particularly, a filling rate of the core segments may be gradually reduced while passing through the first transition region T1 and the second transition region T2. Here, the filling rate of the core segments refers to a ratio of an area occupied by the core segments within a unit area. As a result, the restriction of the waveguide light by the core structure 1001 may be gradually weakened. Thus, the optical mode may gradually increase in size. The filling rate of the core segments may be constant on the second waveguide region 103. As a result, the size of the optical mode may be uniformly maintained on the second waveguide region 103.

Figure 5:
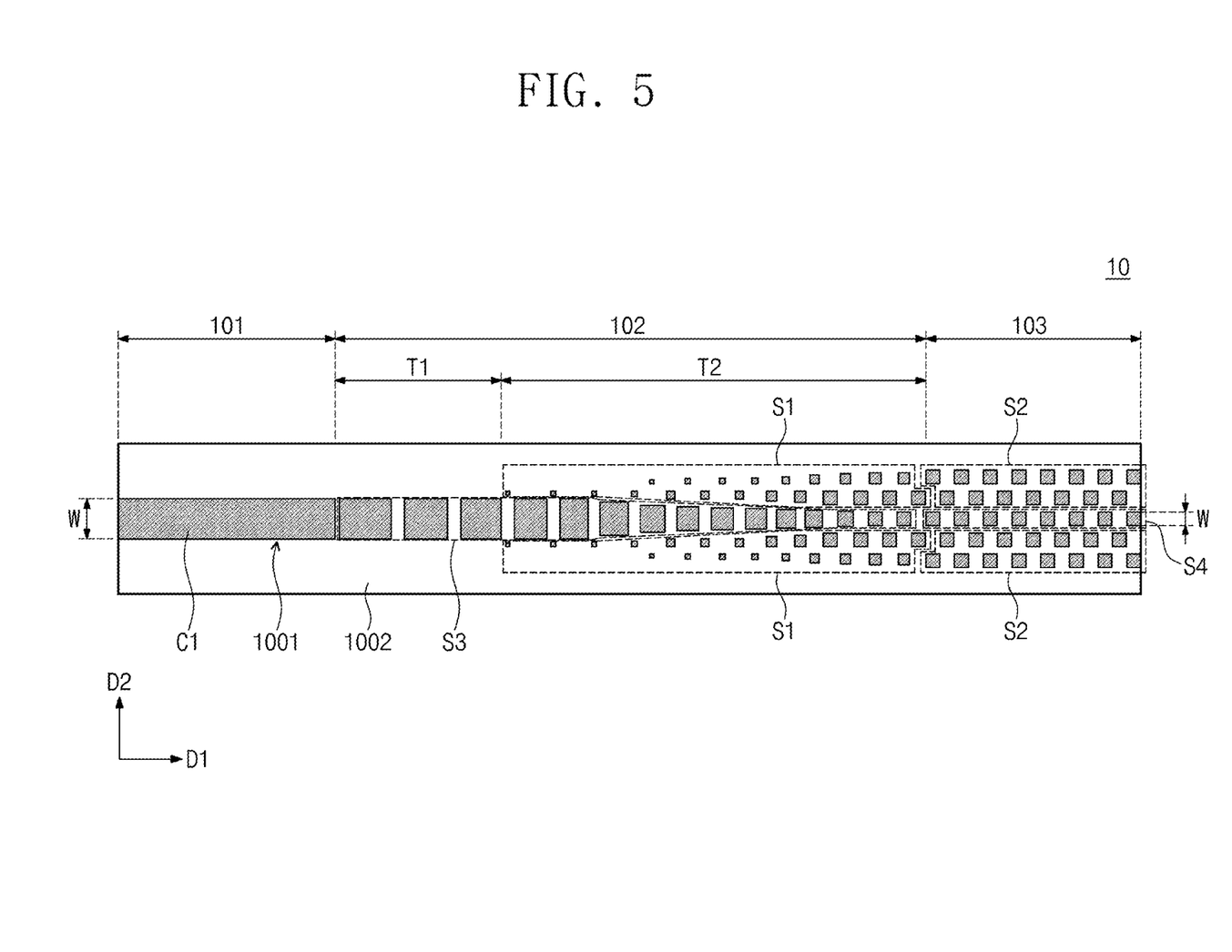
FIG. 5 is a plan view illustrating a modified example of the optical waveguide structure according to some embodiments of the inventive concept.

FIG. 5 is a plan view illustrating a modified example of the optical waveguide structure 10 according to some embodiments of the inventive concept. For simplicity of explanation, differences from the optical waveguide structure 10 described with reference to FIG. 1 will be mainly described.

Referring to FIG. 5, a core structure 1001 according to a modified example is substantially the same as the core structure 1001 described with reference to FIG. 1 except for a relative arrangement of first and second core segments S1 and S2 and a plurality of third and fourth segments S3 and S4.

The first core segments S1 and the plurality of third core segments S3 may be arranged in a zigzag form in the second direction D2 on a second transition region T2. The plurality of fourth core segments S4 and the second core segments S2 may be arranged in a zigzag form in the second direction D2 on a second waveguide region 103.

Figure 6:
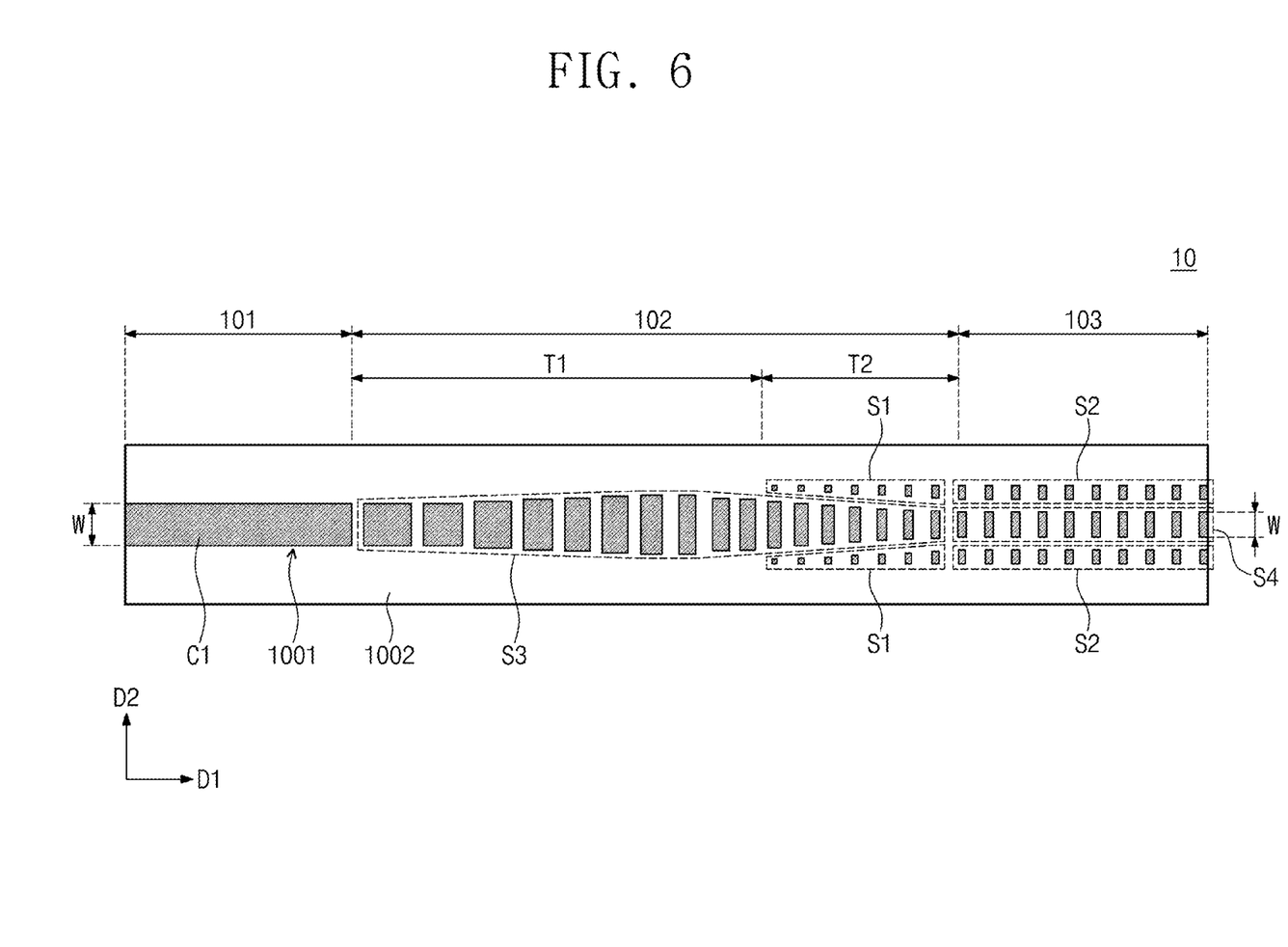
FIG. 6 is a plan view illustrating a modified example of the optical waveguide structure according to some embodiments of the inventive concept.

FIG. 6 is a plan view illustrating a modified example of the optical waveguide structure according to some embodiments of the inventive concept. For simplicity of explanation, differences from the optical waveguide structure 10 described with reference to FIG. 1 will be mainly described.

Referring to FIG. 6, a core structure 1001 according to a modified example is substantially the same as the core structure 1001 described with reference to FIG. 1 except for widths, lengths, and a relative arrangement of first and second core segments S1 and S2 and a plurality of third and fourth segments S3 and S4.

Each of the third core segments S3 may have a width W in a second direction D2. The widths W may increase and then decrease in a first direction D1 on a transition region 102. The plurality of third core segments S3 and the first core segments S1 may be aligned in the second direction D2 on the second transition region T2. The plurality of fourth core segments S4 and the second core segments S2 may be aligned in the second direction on a second waveguide region 103.

Figure 7:
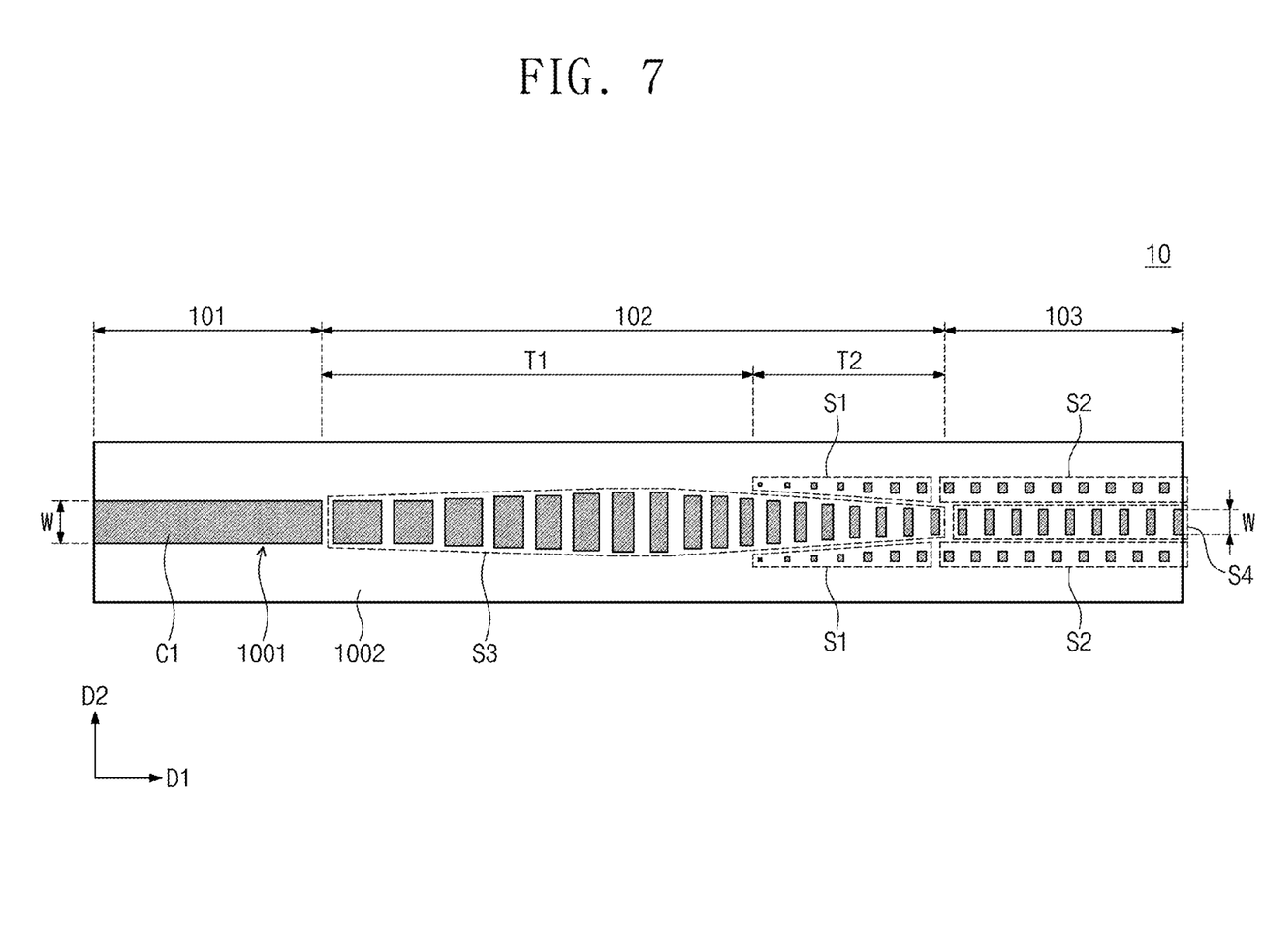
FIG. 7 is a plan view illustrating a modified example of the optical waveguide structure according to some embodiments of the inventive concept.

FIG. 7 is a plan view illustrating a modified example of the optical waveguide structure according to some embodiments of the inventive concept. For simplicity of explanation, differences from the optical waveguide structure 10 described with reference to FIG. 6 will be mainly described.

Referring to FIG. 7, a core structure 1001 according to a modified example is substantially the same as the core structure 1001 described with reference to FIG. 6 except for a relative arrangement of first and second core segments S1 and S2 and a plurality of third and fourth segments S3 and S4.

The first core segments S1 and the plurality of third core segments S3 may be arranged in a zigzag form in a second direction D2 on a second transition region T2. The plurality of fourth core segments S4 and the second core segments S2 may be arranged in a zigzag form in the second direction D2 on the second waveguide region 103.

Figure 8:
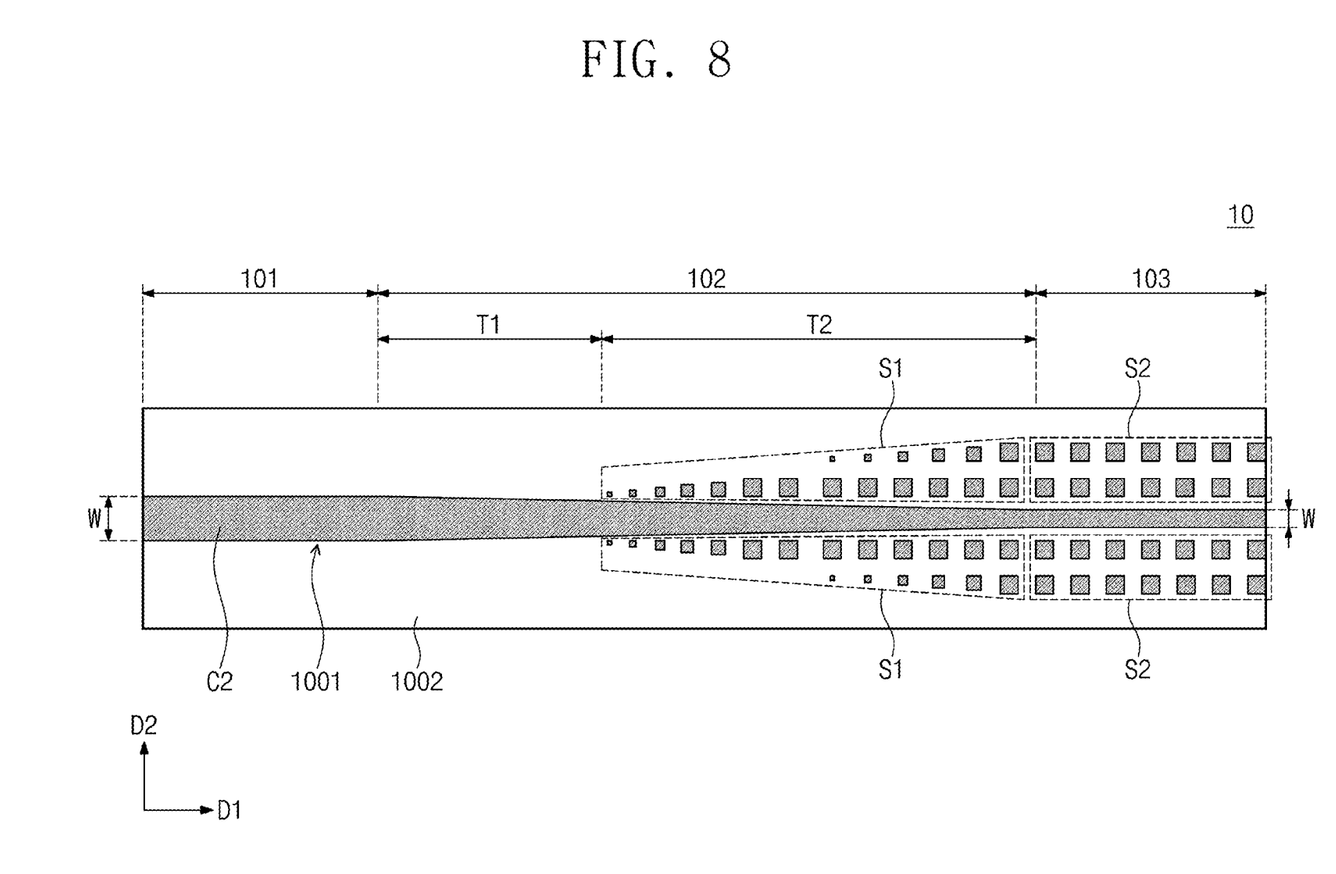
FIG. 8 is a plan view of an optical waveguide structure including a two-dimensionally segmented core structure according to some embodiments of the inventive concept.

FIG. 8 is a plan view of an optical waveguide structure including a two-dimensionally segmented core structure according to some embodiments of the inventive concept.

Referring to FIG. 8, the optical waveguide structure 10 may include a substrate 1002 and a core structure 1001 on the substrate 1002. The substrate 1002 may include a first waveguide region 101, a second waveguide region 103, and a transition region 102 between the first waveguide region 101 and the second waveguide region 103. The transition region 102 may include a first transition region T1 adjacent to the first waveguide region 101 and a second transition region T2 adjacent to the second waveguide region 103. The core structure 1001 may include first core segments S1 arranged in a first direction D1 and a second direction D2 crossing the first direction D1 on the second transition region T2. The core structure 1001 may include second core segments S2 arranged in the first direction D1 and the second direction D2 on the second waveguide region 103. The core structure 1001 may include a main core pattern C2 crossing the first waveguide region 101, the transition region 102, and the second waveguide region 103 in the first direction D1. The main core pattern C2 may have a line shape extending from the first waveguide region 101 to the second waveguide region 103 via the transition region 102. The main core pattern C2 may have a line shape that is tapered in the first direction D1 on the transition region 102. The first core segments S1 may be disposed on both sides of the main core pattern C2 on the second transition region T2 and be aligned in the first direction D1 and the second direction D2. The main core pattern C2 may be disposed between the first core segments S1. The second core segments S2 may be disposed on both sides of the main core pattern C2 on the second waveguide region 103 and be aligned in the first direction D1 and the second direction D2. The main core pattern C2 may be disposed between the second core segments S2.

Figure 9:
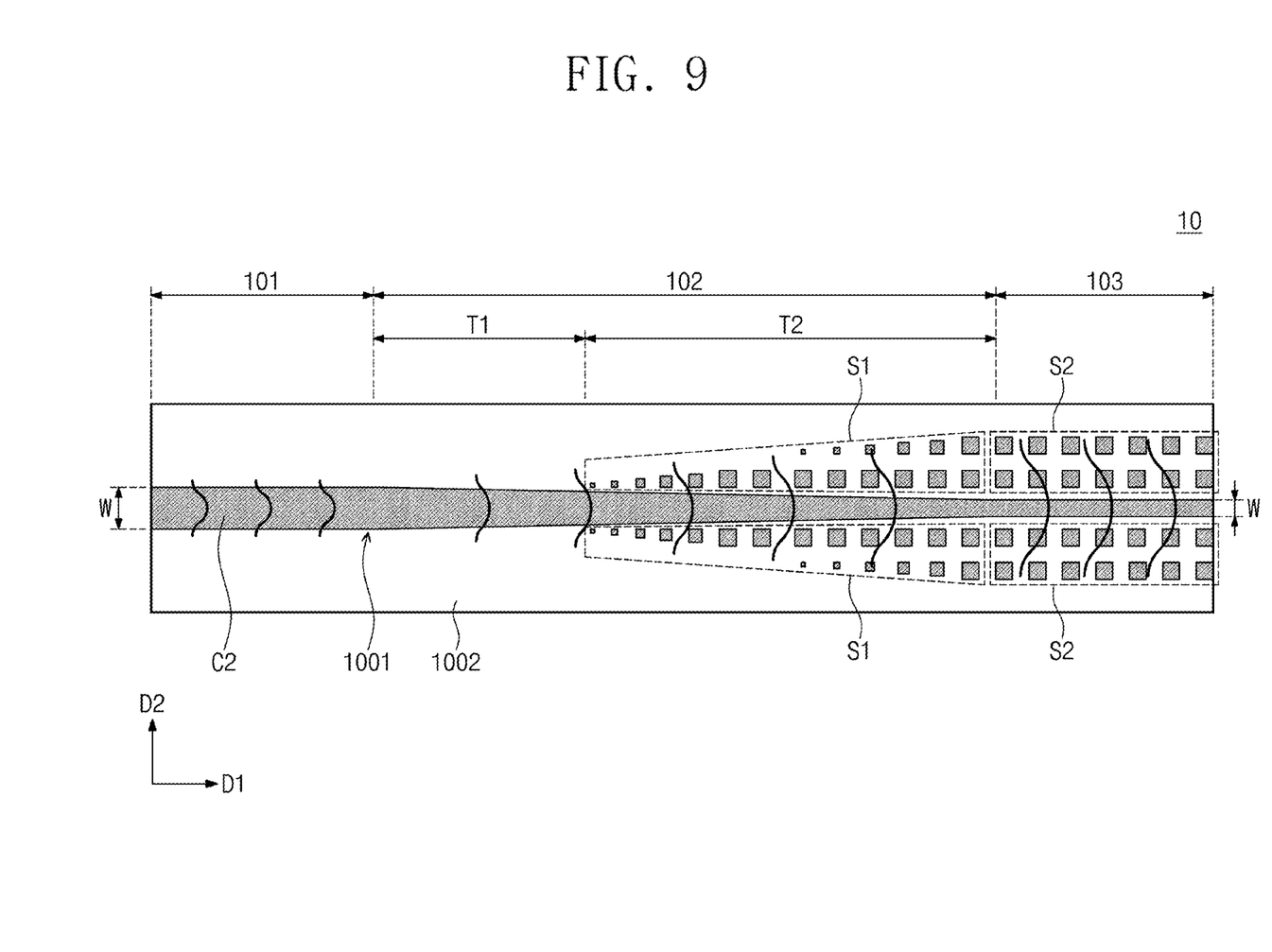
FIG. 9 is a conceptual view illustrating a variation in optical mode size due to the optical waveguide structure of FIG. 8.

FIG. 9 is a conceptual view illustrating a variation in optical mode size due to the optical waveguide structure 10 of FIG. 8.

Referring to FIG. 9, the optical waveguide structure 10 may basically be a single mode planar optical waveguide in which only a zeroth-order or fundamental optical mode is excited. A parabolic curve represents the optical mode, and as the parabola increases in size, the optical mode may increase in size. In this case, a difference in refractive index between the core structure 1001 and the clad 1003 may be constantly maintained. The optical mode may have a uniform size in the first waveguide region 101. The optical mode may have a size that gradually increases on the transition region 102. Particularly, in view of the plane, the sizes of the first core segments S2 may increase or be uniform in the first direction D1 on the second transition region T2. The main core pattern C2 may have a width W that gradually decreases through the first transition region T1 and the second transition region T2. As a result, the restriction of the waveguide light by the core structure 1001 may be gradually weakened. Thus, the optical mode may gradually increase in size. The sizes of the second core segments S2 may be uniformly maintained on the second waveguide region 103. The main core pattern C2 may have a uniform width W on the second waveguide region 103. As a result, the size of the optical mode may be uniformly maintained on the second waveguide region 103. Since the first core segments S1 and the second core segments S2 are provided, it is possible to reduce the difficulty of precisely controlling the width W of the main core pattern C2.

Figure 10:
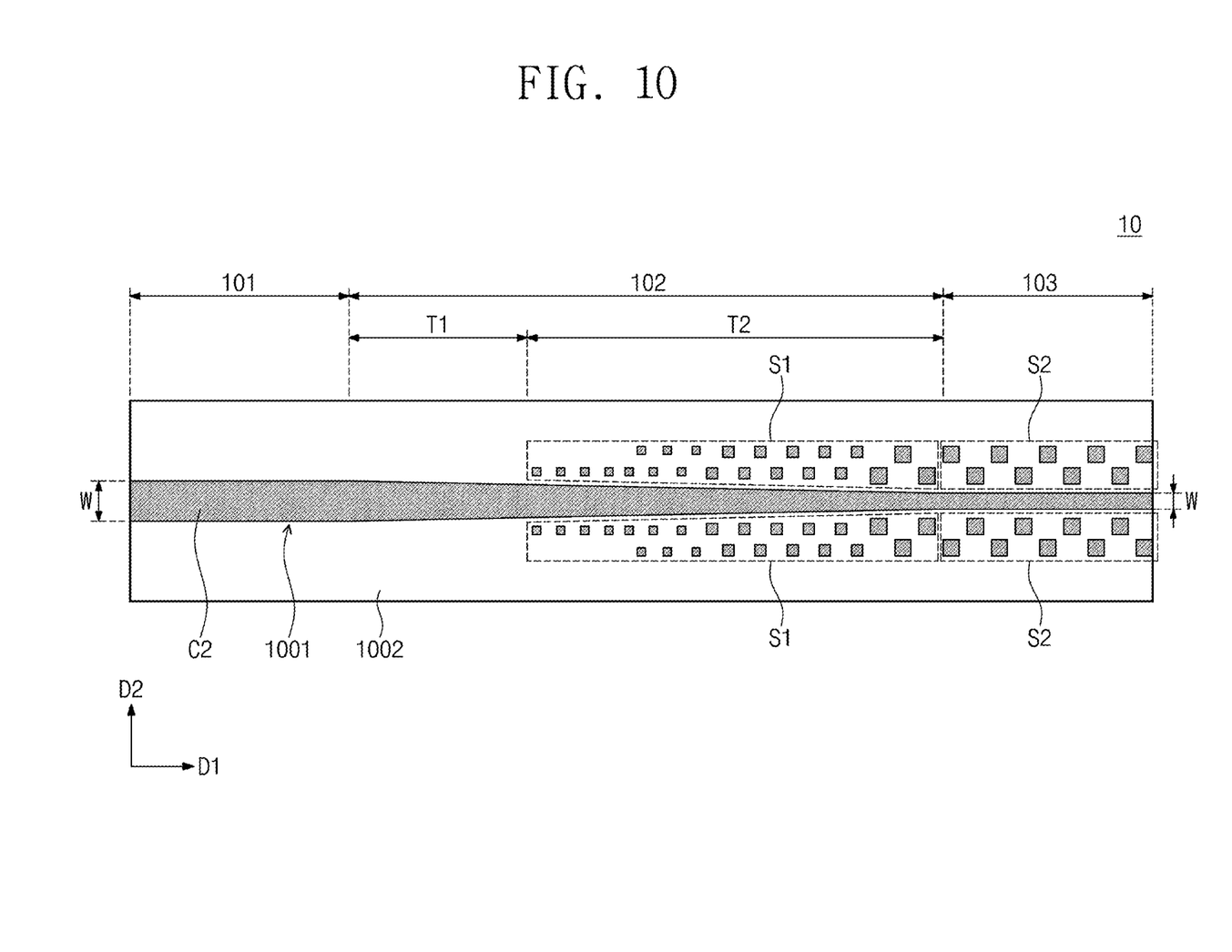
FIG. 10 is a plan view illustrating a modified example of the optical waveguide structure according to some embodiments of the inventive concept.

FIG. 10 is a plan view illustrating a modified example of the optical waveguide structure according to some embodiments of the inventive concept. For simplicity of explanation, differences from the optical waveguide structure 10 described with reference to FIG. 1 will be mainly described.

Referring to FIG. 10, a core structure 1001 according to a modified example is substantially the same as the core structure 1001 described with reference to FIG. 8 except for a relative arrangement of first and second core segments S1 and S2.

The first core segments S1 may be arranged in a zigzag form in a second direction D2 on a second transition region T2. The second core segments S2 may be arranged in a zigzag form in the second direction D2 on a second waveguide region 103.

Figure 11:
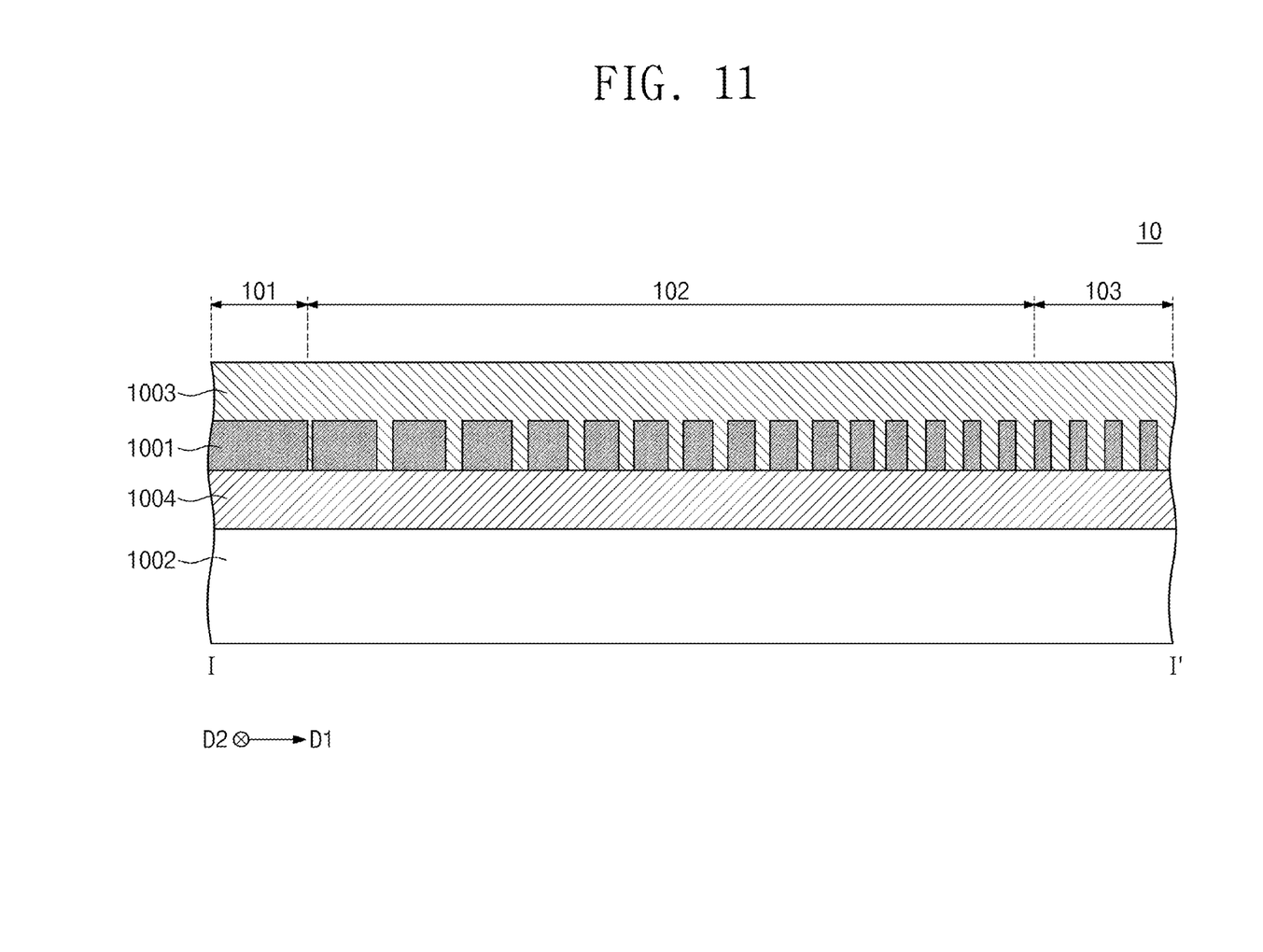
FIG. 11 is a cross-sectional view of the optical waveguide structure including the main core pattern of FIG. 1.

FIG. 11 is a cross-sectional view of the optical waveguide structure including the main core pattern of FIG. 1. For simplicity of explanation, differences from the optical waveguide structure 10 described with reference to FIG. 2 will be mainly described.

Referring to FIG. 11, a lower clad 1004, the core structure 1001, and an upper clad 1003 may be sequentially provided on the substrate 1002. The core structure 1001 may have a refractive index greater than that of each of the lower and upper dads 1004 and 1003. For example, the core structure 1001 may be a silicon nitride layer or a silicon oxynitride layer, and each of the lower and upper dads 1004 and 1003 may be a silicon oxide layer. For another example, the core structure 1001 may be a silicon oxide layer doped with germanium (Ge), and the lower and upper dads 1004 and 1003 may be a silicon oxide layer doped with boron (B) and/or phosphorus (P). In this case, the lower clad 1004 may have a doping concentration less than that of the upper clad 1003.

According to the embodiments of the inventive concept, the planar waveguide structure in which the degree of freedom of the design for the optical mode size conversion increases may be provided.

The above-described descriptions according to the embodiments of the inventive concept are exemplarily provided for explaining the inventive concept. Thus, it is understood that the present invention should not be limited to these exemplary embodiments but various changes and modifications can be made by one ordinary skilled in the art within the spirit and scope of the present invention as hereinafter claimed.

What is claimed is:

1. An optical waveguide structure comprising:
a substrate comprising a first waveguide region, a second waveguide region, and a transition region between the first waveguide region and the second waveguide region; and
a core structure disposed on the substrate,
wherein the core structure comprises:
first core segments arranged in a first direction and a second direction crossing the first direction on the transition region; and
second core segments arranged in the first direction and the second direction on the second waveguide region,
wherein the first direction and the second direction are parallel to a top surface of the substrate.

2. The optical waveguide structure of claim 1, wherein the core structure further comprises a main core pattern crossing the first waveguide region and the transition region in the first direction, and
the main core pattern is disposed between the first core segments.

3. The optical waveguide structure of claim 2, wherein the main core pattern crosses the second waveguide region via the transition region in the first direction, and
the main core pattern is disposed between the second core segments.

4. The optical waveguide structure of claim 3, wherein the transition region comprises:

a first transition region adjacent to the first waveguide region; and a second transition region adjacent to the second waveguide region, wherein the main core pattern comprises a plurality of third core segments arranged to be spaced apart from each other in the first direction on the transition region, and the first core segments are disposed around a column of the plurality of third core segments on the second transition region.

5. The optical waveguide structure of claim 4, wherein each of the plurality of third core segments has a length in the first direction, and the lengths of the plurality of third core segments gradually decrease in the first direction on the transition region.

6. The optical waveguide structure of claim 5, wherein each of the plurality of third core segments has a width in the second direction, and the widths of the plurality of third core segments gradually decrease in the first direction on the transition region.

7. The optical waveguide structure of claim 5, wherein each of the plurality of third core segments has a width in the second direction, and the widths of the plurality of third core segments gradually increase and then decrease in the first direction on the transition region.

8. The optical waveguide structure of claim 4, wherein the main core pattern comprises a plurality of fourth core segments arranged to be spaced apart from each other in the first direction on the second waveguide region, and the second core segments and the plurality of fourth core segments are aligned with each other in the second direction on the second waveguide region.

9. The optical waveguide structure of claim 8, wherein the first core segments and the plurality of third core segments are aligned with each other in the second direction on the second transition region.

10. The optical waveguide structure of claim 4, wherein the main core pattern comprises a plurality of fourth core segments arranged to be spaced apart from each other in the first direction on the second waveguide region, and the second core segments and the plurality of fourth core segments are arranged in a zigzag form in the second direction on the second waveguide region.

11. The optical waveguide structure of claim 10, wherein the first core segments and the plurality of third core segments are arranged in a zigzag form in the second direction on the second transition region.

12. The optical waveguide structure of claim 3, wherein the transition region comprises:

a first transition region adjacent to the first waveguide region; and a second transition region adjacent to the second waveguide region, wherein the main core pattern has a line shape that is tapered in the first direction on the transition region, and the first core segments are disposed around the main core pattern on the second transition region.

13. The optical waveguide structure of claim 12, wherein the main core pattern has a line shape extending in the first direction on the second waveguide region, and the second core segments are aligned with each other in the second direction with the main core pattern therebetween on the second waveguide region.

14. The optical waveguide structure of claim 13, wherein the first core segments are aligned with each other in the second direction with the main core pattern therebetween on the second transition region.

* * * * *